United States Patent
Limansky et al.

(10) Patent No.: US 6,349,662 B1
(45) Date of Patent: Feb. 26, 2002

(54) RUB RAIL

(75) Inventors: Joseph Limansky, Boca Raton; Dominic A. Borotto, Hollywood; Jon E. Kushner; William E. Kushner, both of Miami; Michael N. Kushner, Safety Harbor, all of FL (US)

(73) Assignee: Taco Metals, Inc., Miami, FL (US)

( * ) Notice: Subject to any disclaimer, the term of this patent is extended or adjusted under 35 U.S.C. 154(b) by 0 days.

(21) Appl. No.: 09/750,810

(22) Filed: Dec. 29, 2000

(51) Int. Cl.$^7$ .............................................. B63B 59/02
(52) U.S. Cl. ....................................................... 114/219
(58) Field of Search ................................ 114/343, 219; 293/102, 126

(56) References Cited

U.S. PATENT DOCUMENTS

| | | | | |
|---|---|---|---|---|
| 4,971,980 A | * | 11/1990 | Eisner | 114/219 |
| 5,149,569 A | * | 9/1992 | McCue | 428/31 |
| 5,453,309 A | * | 9/1995 | Shanok et al. | 428/31 |
| 5,706,751 A | * | 1/1998 | Hodges | 114/219 |
| 5,743,204 A | * | 4/1998 | Tweet | 114/219 |
| 5,829,378 A | * | 11/1998 | Nunes et al. | 114/219 |

* cited by examiner

Primary Examiner—Stephen Avila
(74) Attorney, Agent, or Firm—Goodman & Teitelbaum, Esqs.

(57) ABSTRACT

A rub rail for boats and ships including an extruded molding trim fabricated from a rigid plastic material and an extruded insert fabricated from a predetermined plastic material, the molding trim having a longitudinally extending, centrally located recess in an outer top surface of the molding trim to provide laterally spaced apart free end portions at an uppermost top part of the molding trim, and the insert having an arcuately shaped outer top portion. The insert is disposed in the recess of the molding trim so that the outer top portion of the insert engages undersides of each of the free end portions of the molding trim along a first plane, and the outer top surface of the molding trim, as defined by the free end portions, is disposed along a second plane so that the free end portions of the molding trim partially surround the insert to enclose and protect the insert within the recess of the molding trim. The insert includes a U-shaped body having an upper strip-like portion of clear transparent material encapsulating a metalic-like strip, such as mylar, therein to provide a metal appearance to the insert.

14 Claims, 2 Drawing Sheets

RUB RAIL

BACKGROUND OF THE INVENTION

The invention relates to a molding trim, and more particularly to a rub rail for boats and ships, such as sailboats, which includes a decorative insert disposed in a recess of a molding trim so that an outer top portion of the insert is engaged under longitudinally extending, laterally spaced apart free end portions at an uppermost top part of the molding trim to partially surround the insert and enclose the insert within the recess of the molding trim to protect the insert, the molding trim being fabricated from an extruded rigid plastic material, and the insert being fabricated from an extruded flexible plastic material. The insert includes an upper strip-like portion of clear transparent material encapsulating a metalic-like strip therein to provide a metal appearance to the insert, preferably the metalic-like strip is fabricated from mylar, metal foils and the like.

Rub rails are well known in the boat and ship prior art, where the rub rails are usually provided along the outside upper edge of the hull from and around the bow to the stern, including extending around the transom. Thus, the rub rail functions to protect the hull when the boat or ship bumps against an object outside of the boat or the ship, such as the sides of a wharf when the boat or ship is docking.

Rub rails can be fabricated from wood, where the wood is shaped to fit the particular boat or ship. However, due to the large expense of using wood, present-day rub rails, and particularly replacement rub rails, are fabricated from stainless steel, aluminum, rigid and semi-rigid vinyl. Stainless steel rub rails offer the maximum durability and a classy style, where many rigid vinyl rub rails are designed to accept a stainless steel overlap to provide a decorative appearance. However, aluminum and stainless steel are expensive, and sometimes difficult to work with, particularly when installing a replacement rub rail that extends completely around the boat or ship from the bow to the stern.

Accordingly, there is presently a need for an extruded rub rail that can be easily and inexpensively manufactured, and which provides a simple and quick method for attaching the rub rail to the outer surface of the hull of a boat or ship, in which the rub rail can easily be bent around the bow and transom corners, and in which the insert of the rub rail provides a decorative appearance thereto.

SUMMARY OF THE INVENTION

It is accordingly an object of the present invention to provide a rub rail for boats and ships which avoids the problems and disadvantages of the prior art devices.

Another object of the present invention is to provide a rub rail including a decorative insert disposed in a recess of a molding trim so that laterally spaced apart free end portions at an uppermost top part of the molding trim partially surround the insert and enclose the insert within the recess of the molding trim to protect the insert.

A further object of the present invention is to provide a rub rail, as described above, in which the molding trim is fabricated from an extruded rigid plastic material, and the insert is fabricated from an extruded flexible or rigid plastic material.

Still another object of the present invention is to provide a rub rail, as described above, in which the insert includes an upper strip-like portion of clear plastic material encapsulating a metalic-like strip therein to provide a metal appearance to the insert, where preferably, the metalic-like strip is fabricated from mylar, metal foils and the like.

Another object of the present invention is to provide a rub rail, as described above, in which the insert has a U-shaped longitudinally extending body including an arcuately shaped outer top bight portion with two spaced apart leg portions extending downwardly from the top bight portion.

Yet another object of the present invention is to provide a rub rail, as described above, in which outer surfaces of the leg portions of the insert are tapered inwardly towards each other in a direction towards free ends of the insert to facilitate the insertion of the insert into the recess of the molding trim.

Yet another object of the present invention is to provide a rub rail, as described above, in which the molding trim of the rub rail is first secured to the hull of the boats and ships, and then the insert is secured to the molding trim either by being snapped transversely into the recess or by being inserted longitudinally through the recess.

And still yet another object of the present invention is to provide a rub rail, as described above, which can be easily and inexpensively manufactured, which provides a simple and quick method for attaching the rub rail to the outer surface of the hull of a boat or ship, and in which the rub rail can easily be bent around the bow and transom corners when being installed.

Briefly, in accordance with the present invention, there is provided a rub rail for boats and ships including an extruded longitudinally extending molding trim fabricated from a rigid plastic material and an extruded longitudinally extending insert fabricated from a flexible plastic material. The molding trim has a longitudinally extending, centrally located recess in an arcuately shaped outer top surface of the molding trim to provide longitudinally extending, laterally spaced apart free end portions at an uppermost top part of said molding trim. The insert has a longitudinally extending, centrally located, arcuately shaped outer top portion. Thus, when the insert is disposed in the recess of the molding trim, the outer top portion of the insert engages undersides of each of the free end portions of the molding trim along a first plane, and the outer top surface of the molding trim, as defined by the free end portions, is disposed along a second plane. The second plane is disposed above the first plane so that the free end portions of the molding trim partially surround the insert to enclose and protect the insert within the recess of the molding trim.

The insert is secured to the molding trim, and the molding trim of the rub rail is secured to the boats and ships.

The insert includes an upper strip-like portion of clear transparent material encapsulating a metalic-like strip therein to provide a metal appearance to the insert. Preferably, the metalic-like strip is fabricated from mylar or metal foils.

The insert has a U-shaped longitudinally extending body so that the outer top portion defines an arcuately shaped outer top bight portion with two spaced apart leg portions extending downwardly from the top bight portion. Notches are provided in inner walls of the free end portions of the molding trim, and shoulders are provided on opposite sides of the insert below the outer top portion, the shoulders being engaged in associated ones of the notches to secure the insert to the molding trim. Outer surfaces of the leg portions of the insert are tapered inwardly towards each other in a direction towards the free ends of the insert to facilitate the insertion of the insert into the recess of the molding trim.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which.

In the various figures of the drawings, like reference characters designate like parts.

DESCRIPTION OF THE PREFERRED EMBODIMENT

Figure 1:
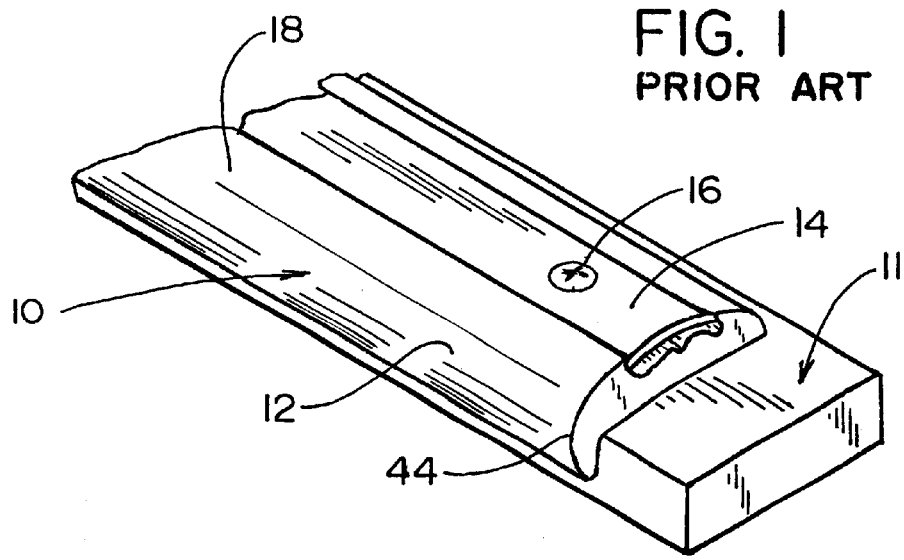
FIG. 1 is a fragmented perspective view showing a prior art rub rail for use on boats and ships.
Figure 2:
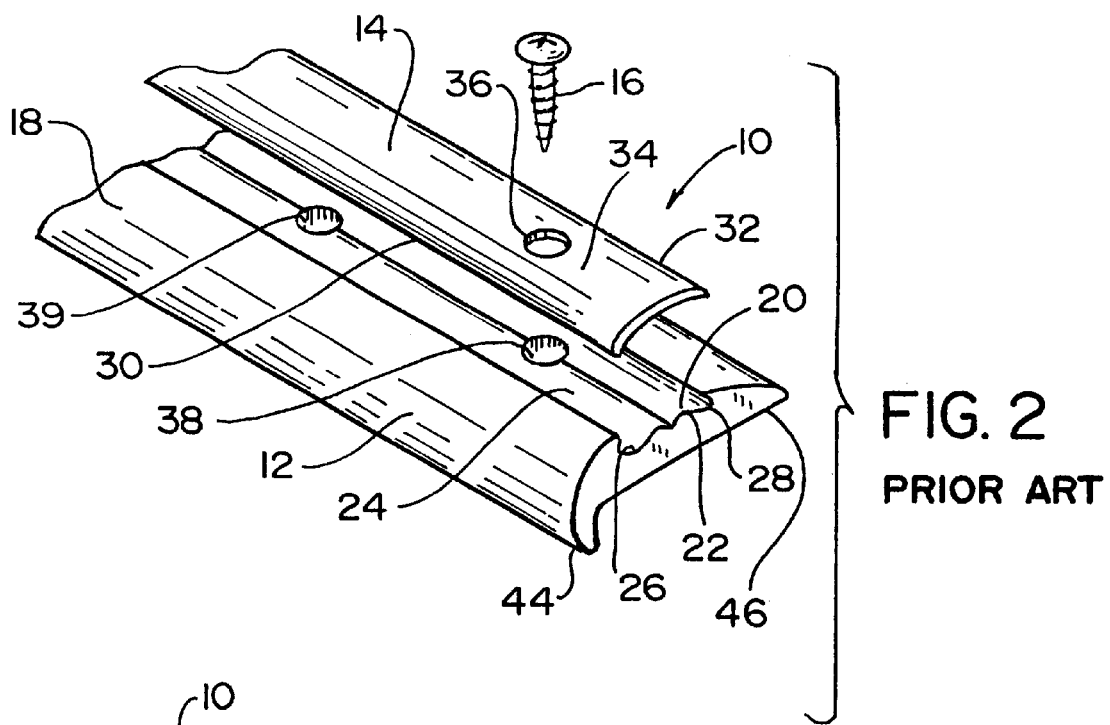
FIG. 2 is a fragmented exploded view of the parts of the rub rail shown in FIG. 1.
Figure 3:
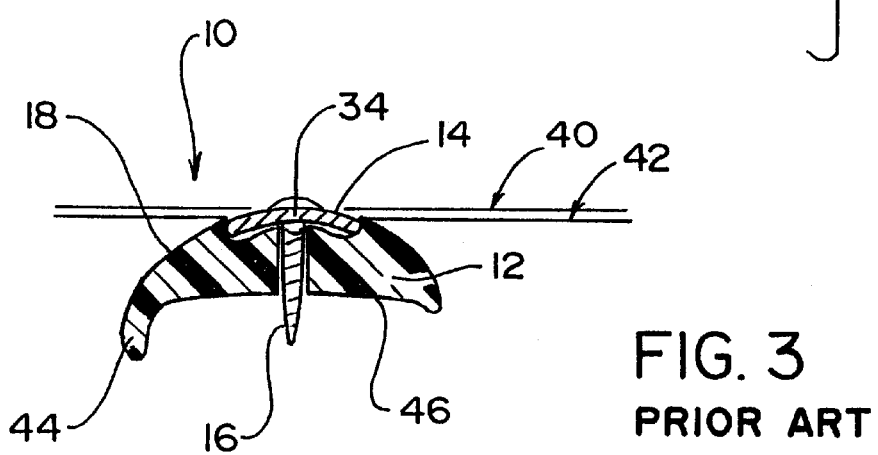
FIG. 3 is a cross sectional view taken transversely through the prior art rub rail shown in FIG. 1.

Referring now to the drawings, FIGS. 1, 2 and 3 show a prior art rub rail 10 for use on boats and ships, such as a sailboat, where the rub rail runs on the upper panel 11 of the hull from the bow to the stern along the outside edge thereof.

As best shown in FIG. 2, the rub rail 10 includes an extruded molding trim 12, preferably fabricated from a plastic material such as PVC (polyvinyl chloride), a metal insert 14, preferably fabricated from a shiny stainless steel, aluminum or chrome material, and a numerous number of metal screws 16 as required in order to secure the insert 14 to the molding trim 12.

The molding trim 12 has an arcuately shaped outer top surface 18 having a longitudinally extending centrally located recess 20 therein. The recess 20 has a longitudinally extending V-shaped notch 22 along the central portion of the bottom wall 24 therein. A longitudinally extending pocket 26, 28 is provided on opposite sides of the recess 20 to receive the insert 14 therein as set forth below.

The insert 14 has an arcuate shape to provide longitudinally extending side edges 30, 32, and a longitudinally extending apex portion 34. Accordingly, in one form of the prior art, a series of non-threaded holes 36 are provided along the apex 34 as required, and corresponding associated non-threaded holes 38 are provided through the bottom wall 24 of the molding trim 12 along the notch 22. The non-threaded holes 36 and the corresponding associated non-threaded holes 38 receive corresponding associated screws 16 therein when the insert 14 and molding trim 12 are assembled together, as set forth below.

In the assembly thereof, the molding trim 12 is first secured against the hull top panel 11 by conventional means such as fasteners, adhesives and the like, for example, by a screw 39 shown in FIG. 2. One longitudinal end of the insert 14 is then inserted into the recess 20 of the molding trim 12 so that the side edge 30 of the insert 14 is received in the pocket 26 of the recess 20. The other side edge 32 of the insert 14 is received in the opposing pocket 28 of the recess 20, as best shown in FIG. 3.

The insert 14 is now pushed through the recess 20 until the insert 14 is fully inserted therein, so that at this point, the associated holes 36 should be in alignment with their corresponding holes 38. Obviously, if these holes 36, 38 are not in alignment, then they should be made to be in alignment. The screws 16 are now passed through the holes 36 in the insert 14, and the associated holes 38 to hold the insert and the molding trim 12 together, as best shown in FIG. 3.

It is noted, as shown in FIG. 3, that the longitudinally extending apex 34 of the insert 14 is disposed in a first plane 40 disposed above or outwardly from a second plane 42 passing through the uppermost top portion of the molding trim 12, so that the metal insert 14 protects the plastic molding trim 12.

Preferably as shown in FIGS. 1–3, the molding trim 12 has a longitudinally extending flange 44 extending outwardly from the undersurface 46 of the molding trip 12. In use, the flange 44 is positioned against the bottom edge of the top panel of the hull of the boat or ship to firmly position the rub rail 10 thereon, so that the screws 16 can now be threaded into the hull.

In another form of the prior art, no holes are initially provided in the apex 34 of the insert 14 nor through the bottom wall 24 of the molding trip 12. Accordingly, the flange 44 of the molding trim 12 is positioned against the hull top panel 11 and held in place by conventional means well known in the art, such as by fasteners, adhesives and the like.

A conventional drill is now used to provide the properly spaced apart and aligned holes 36 in the insert 14 and holes 38 in the holding trim 12, where the drill bit thereof forms the corresponding holes 36, 38 at the same time, and also forms a corresponding aligned hole, not shown, in the hull top panel 11. Corresponding screws 16 are now inserted through each set of holes 36, 38, and then threaded into the hull top panel 11 of the boat or ship for securement thereto.

Figure 4:
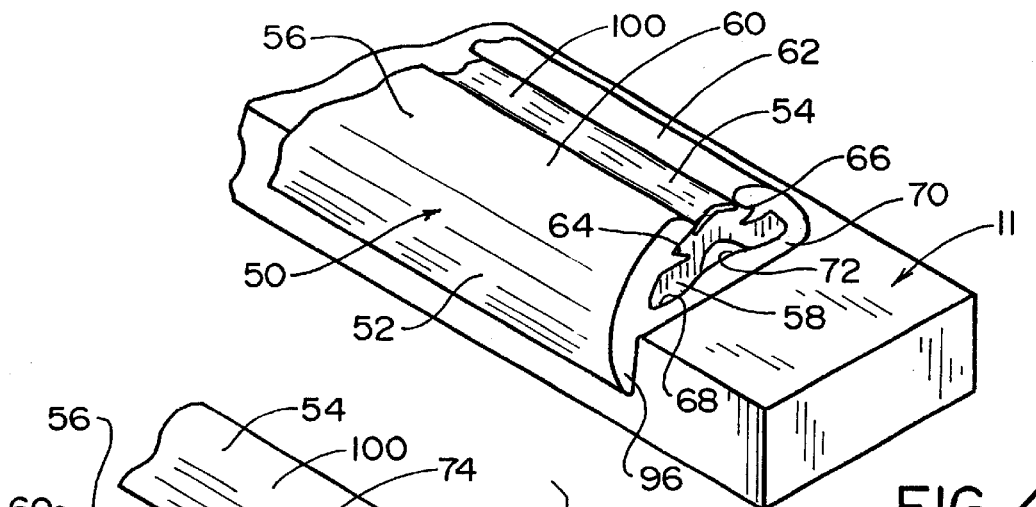
FIG. 4 is a fragmented perspective view of a rub rail for boats and ships in accordance with the present invention.
Figure 5:
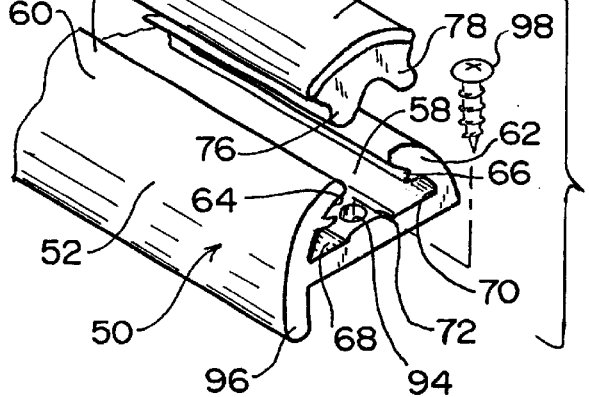
FIG. 5 is a fragmented exploded perspective view of the parts of the rub rail shown in FIG. 4.

FIG. 4 shows a rub rail 50 according to the present invention, As in the prior art, the rub rail 50 includes an extruded longitudinally extending molding trim 52, preferably fabricated from a substantially rigid plastic material such as PVC, and an extruded, longitudinally extending insert 54, preferably fabricated from a flexible or rigid plastic material, such as PVC, as best shown in FIG. 5.

Like the prior art, the molding trim 52 has an arcuately shaped outer top surface 56 provided with a longitudinally extending centrally located recess 58 therein. The longitudinally extending, laterally spaced apart free end portions 60, 62, at the uppermost top part of the molding trim 52, have longitudinally extending V-shaped notches 64, 66, respectively therein, the function of which will be described below. A longitudinally extending pocket 68, 70 is provided on opposite sides of the recess 58. Additionally, a longitudinally extending, centrally located platform 72 is provided along the bottom wall of the recess 58.

The insert 54 has a substantially U-shaped longitudinally extending body to provide an arcuately shaped bight portion 74 connecting two spaced apart leg portions 76, 78 extending outwardly therefrom. The outer surfaces 80, 82 are tapered inwardly towards the free ends of the leg portions 76, 78, respectively. The bases of the leg portions 76, 78 are reduced adjacent to the bight portion 74 to provide shoulders 84, 86 respectively, the function of which will be described below.

Figure 7:
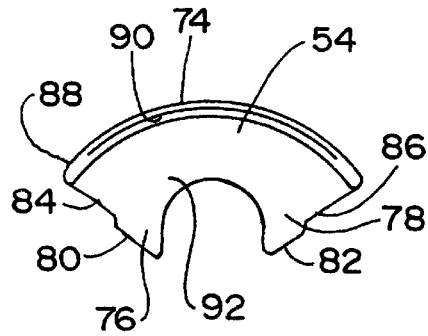
FIG. 7 is an enlarged end view of the insert shown in FIG. 5.

As best shown in the enlarged view of the insert 54 in FIG. 7, the upper, longitudinally extending strip-like portion 88 is preferably fabricated from a clear transparent material, and encapsulates a longitudinally extending metalic-like strip 90 therein when extruded with the lower portion 92 of the insert 54, such construction being well known in the prior art. The metalic-like strip 90 extends for the entire longitudinal length of the upper strip-like portion 88 so that the upper strip-like portion 88 takes on the appearance of the metalic-like strip 90. For example, if the metalic-like strip 90 is a shiny aluminum or has a chrome finish, then the upper strip-like portion 88 would have a metal appearance, such as normally found on automobiles and appliances.

Accordingly, the metalic-like strip 90 can be made in any color or texture as desired to provide the upper strip-like portion 88 with a particular decorative appearance. Preferably, the metalic-like strip 90 is fabricated from a metalized mylar, or any other suitable material such as a chrome film, tinfoil and the like, which is fed in or coated on during the extrusion process. As is well known in the prior art, the upper strip-like portion 88 can be given a decorative appearance of wood by providing a wood grain finish on the metalic-like strip 90. Accordingly, the bottom portion 92 can be fabricated in any desired color, where same cannot be seen when the rub rail 50 is assembled.

In the assembly thereof, the extruded molding trim 52 is secured to the upper panel 11 of the hull of the boat or ship in a similar manner as mentioned above with respect to the prior art. Accordingly, a series of longitudinally spaced apart holes 94 are drilled or formed through the centrally located platform 72 in the bottom wall of the recess 58, either before or after the extruded molding trim 52 is positioned on the hull. If the holes 94 are preformed in the extruded molding trim 52, the molding trim 52 is positioned on the hull by means of the longitudinally extending flange 96 in the same manner mentioned above with respect to the prior art flange 44. After the positioning thereof, a series of associated screws 98 are positioned in the holes 94, and screwed therethrough into the hull to secure the molding trim 52 thereon.

Alternately, if the holes 94 are not formed into the molding trim 52, the molding trim 52 is positioned and held on the boat hull in the same manner set forth above. Then, the longitudinally spaced apart holes 94 are drilled in the molding trim 52 so that a pilot hole is formed in the boat hull for each of the holes 94. Thereafter, in the same manner as above, the screws 98 are inserted through the associated holes 94 and into each of the pilot holes in the boat hull. The screws 98 are then screwed into the boat hull to secure the molding trim 52 thereto.

Once the molding trim 52 is secured in a proper manner to the boat hull, the insert 54 can be assembled on to the molding trim 52, in either of two procedures. A first procedure is to squeeze together and insert the free ends of the leg portions 76, 78 into the longitudinally extending recess 58 of the molding trim 52, so that the free ends of the end portions 60 and 62, at the uppermost top part of the molding trim 52, engage against the inwardly tapered outer surfaces 80, 82 of the leg portions 76, 78. The insert 54 is then pushed inwardly into the recess 58, so that the insert 54 snaps into the recess 58 until the shoulders 84, 86 of the insert 54 are engaged in the notches 64, 66 of the molding trim 52, as best shown in FIG. 6.

The second procedure to insert the insert 54 into the recess 58 of the molding trim 52 is very similar to the above mentioned prior art. Accordingly, one longitudinal free end of the insert 54 is inserted into the recess 54 so that the shoulders 84, 86 of the insert 54 are engaged in the notches 64, 66, respectively, of the molding trim 52, as best shown in FIG. 6. The insert 54 is now pushed longitudinally through the recess 58 until the insert 54 is fully inserted therein. Obviously, the insert 54 can be cut to size for proper alignment with the molding trim 52.

Figure 6:
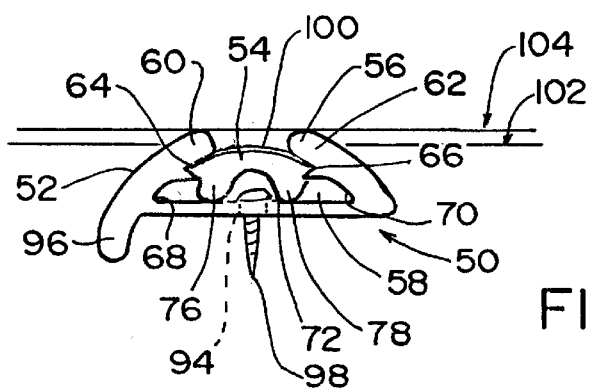
FIG. 6 is an end elevational view of the rub rail shown in FIG. 4.

As clearly indicated in FIG. 6, the longitudinally extending apex 100 of the bight portion 74 of the insert 54 is disposed in a first plane 102. A second plane 104 is disposed above the first plane 102 and passes through the uppermost top part of the molding trim 52 adjacent to the longitudinally extending spaced apart free end portions 60, 62 thereof. Thus, the free end portions 60, 62 of the molding trim 52, which are fabricated from a rigid plastic material, partially surround and act to protect the insert 54, which is fabricated from a flexible or rigid plastic material.

Figure 8:
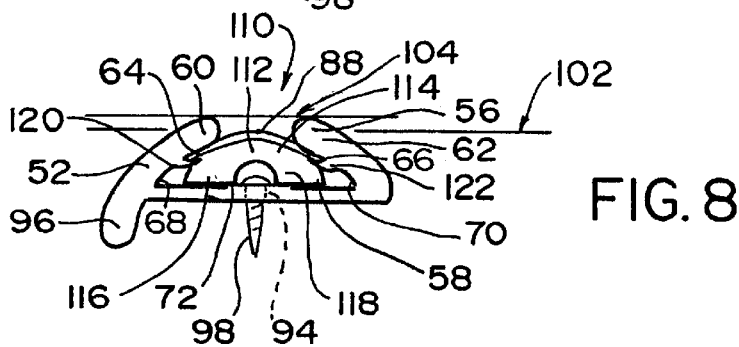
FIG. 8 is an end elevational view of a rub rail having a modified insert.

Referring now to FIG. 8, a modified rub rail 110 is shown according to the present invention, The rub rail 110 includes the above-mentioned extruded molding trim 52 and a modified flexible plastic insert 112, preferably fabricated from a PVC material.

Here again, the insert 112 has a substantially U-shaped longitudinally extending body to provide an arcuately shaped bite portion 114 connecting two spaced apart leg portions 116, 118 extending outwardly therefrom. The bases of the leg portions 116, 118 are also reduced adjacent to the bight portion 114 to provide shoulders 120, 122, respectively, which function in the same manner as the above-mentioned shoulders 84, 86 of the insert 54 in order to engage in the notches 64, 66 of the molding trim 52. It is noted, that the outer surfaces of the leg portions 116, 118 of the insert 112 are not tapered inwardly towards the free ends of the leg portions 116, 118 to distinguish same from the tapered outer surfaces 80, 82 of the leg portions 76, 78 of the insert 54. Furthermore, the leg portions 116, 118 are flat at the free bottoms thereof, and extend longitudinally in alignment with each other.

The insert 112 also includes the above-mentioned upper strip-like decorative portion 88, preferably fabricated from a clear transparent material to encapsulate the metalic-like strip 90 therein when extruded with the lower portion 124 of the insert 112. Having been fully explained above, it is felt that no further details are necessary with respect to the decorative portion 88 and the metalic-like strip 90, except to indicate that the metal appearance thereof is preferred.

Furthermore, it is noted that the assembly of the rub rail 110 is substantially the same as the above-mentioned rub rail 10 by using the screws 98 to secure the molding trim 110 to the boat hull. Then, once the molding trim 110 is secured, the insert 112 is inserted therein either in a first procedure, by squeezing the leg portions 116, 118 together to snap the insert 112 into the recess 58 of the molding trim 52 until the shoulders 120, 122 are engaged in the notches 64, 66 of the molding trim 52, where the insert 112 can be heated as required to provide flexibility thereto, or in a second procedure, by inserting a free end of the insert 110 into the recess 58 of the molding trim 52 and then pushing the insert 110 therethrough, in a similar manner as mentioned above.

Thus, also in a similar manner as mentioned above, the longitudinally extending apex of the bight portion 114 of the insert 112 is disposed in the above-mentioned first plane 102, with the above-mentioned second plane 104 being disposed above the first plane 102. Accordingly, the second plane 104 passes through the uppermost top portion of the molding trim 52 adjacent to the top outer surfaces of the longitudinally extending spaced apart free end portions 60, 62 thereof. As shown in FIG. 8, the free end portions 60, 62 of the molding trim 52, which are fabricated from a rigid plastic material, partially surround and act to protect the insert 12, which is fabricated from a flexible or rigid plastic-material.

Numerous alterations of the structures herein discussed will suggest themselves to those skilled in the art. However, it is to be understood that the present disclosure relates to preferred embodiments of the invention which are for the purpose of illustration only, and are not to be construed as limitations of the invention.

What is claimed is:

1. A rub rail for boats and ships comprising:

an extruded longitudinally extending molding trim fabricated from a rigid plastic material and an extruded longitudinally extending insert fabricated from a predetermined plastic material;

said molding trim having a longitudinally extending, centrally located recess in an arcuately shaped outer top surface of said molding trim to provide longitudinally extending, laterally spaced apart free end portions at an uppermost top part of said molding trim;

said insert having a longitudinally extending, centrally located, arcuately shaped outer top portion;

said insert being disposed in said recess of said molding trim so that said outer top portion of said insert engages undersides of each of said free end portions of said molding trim along a first plane;

said outer top surface of said molding trim, as defined by said free end portions, being disposed along a second plane;

said second plane being disposed above said first plane so that said free end portions of said molding trim partially surround said insert to enclose and protect said insert within said recess of said molding trim;

first means for securing said insert to said molding trim; and second means for securing said rub rail to the boats and ships.

2. A rub rail according to claim 1, wherein said outer top portion of said insert includes an upper, longitudinally extending strip-like portion to provide a decorative appearance to said rub rail.

3. A rub rail according to claim 2, wherein said strip-like portion includes a clear transparent material encapsulating a metalic-like strip therein to provide a metal appearance to said insert.

4. A rub rail according to claim 3, wherein said metalic-like strip is fabricated from mylar.

5. A rub rail according to claim 1, wherein said insert has a U-shaped longitudinally extending body so that said outer top portion defines an arcuately shaped outer top bight portion with two spaced apart leg portions extending downwardly from said top rightportion.

6. A rub rail according to claim 5, wherein said top bight portion includes an upper, longitudinally extending strip-like portion to provide a decorative appearance to said rub rail.

7. A rub rail according to claim 6, wherein said strip-like portion includes a clear transparent material encapsulating a metalic-like strip therein to provide a metal appearance to said insert.

8. A rub rail according to claim , wherein said leg portions engage a bottom wall of said recess in said molding trim.

9. A rub rail according to claim 5, wherein said first means includes notches provided in inner walls of said free end portions of said molding trim, and shoulders provided on opposite sides of said insert below said outer top portion, said shoulders being engaged in associated ones of said notches to secure said insert to said molding trim.

10. A rub rail according to claim 9, wherein said second means includes screws extending through a bottom wall of said recess in said molding trim into walls of the boats and ships, with heads of said screws being engaged against said bottom wall of said recess, said heads being positioned between said leg portions of said insert.

11. A rub rail according to claim 5, wherein outer surfaces of said leg portions of said insert are tapered inwardly towards each other in a direction towards free ends of said leg portions to facilitate insertion of said insert into said recess of said molding trim.

12. A rub rail according to claim 5, wherein said second means includes screws extending through a bottom wall of said recess in said molding trim into walls of the boats and ships, with heads of said screws being engaged against said bottom wall of said recess, said heads being positioned between said leg portions of said insert.

13. A rub rail according to claim 1, wherein said predetermined plastic material is flexible.

14. A rub rail according to claim 3, wherein said predetermined plastic material is rigid.

* * * * *